United States Patent [19]

Hayashi

[11] Patent Number: 5,200,203
[45] Date of Patent: Apr. 6, 1993

[54] APPARATUS FOR QUANTITATIVELY DIVIDING BREAD DOUGH

[75] Inventor: Torahiko Hayashi, Utsunomiya, Japan

[73] Assignee: Rheon Automatic Machinery Co., Ltd., Tokyo, Japan

[21] Appl. No.: 830,778

[22] Filed: Feb. 3, 1992

Related U.S. Application Data

[63] Continuation of Ser. No. 571,467, Aug. 22, 1990, abandoned.

[30] Foreign Application Priority Data

Aug. 28, 1989 [JP] Japan .................................. 1-220992

[51] Int. Cl.$^5$ .............................................. A21C 5/00
[52] U.S. Cl. ..................................... 425/142; 83/365; 198/604; 264/40.2; 264/40.7; 425/145; 425/308; 426/503
[58] Field of Search .................. 83/359, 365; 198/604, 198/606, 607, 817; 264/40.2, 40.7, 148; 425/142, 145, 239, 296, 297, 305.1, 308; 426/503, 518

[56] References Cited

U.S. PATENT DOCUMENTS

| 2,637,890 | 5/1953 | Ramsay | 264/148 |
|---|---|---|---|
| 2,642,013 | 6/1953 | Enoch . | |
| 4,457,771 | 7/1984 | Ambrogi | 264/148 |
| 4,460,611 | 7/1984 | Suzuki | 425/297 |
| 4,492,550 | 1/1985 | Levine | 425/142 |
| 4,548,571 | 10/1985 | Suzuki | 425/297 |
| 4,552,523 | 11/1985 | Suzuki | 425/308 |
| 4,556,379 | 12/1985 | Ikishima | 425/297 |
| 4,597,731 | 7/1986 | Suzuki | 425/297 |
| 4,676,727 | 6/1987 | Atwood | 264/148 |
| 4,900,241 | 2/1990 | Sigurdsson | 425/142 |

FOREIGN PATENT DOCUMENTS

| 124487 | 11/1984 | European Pat. Off. . | |
|---|---|---|---|
| 2819512 | 11/1978 | Fed. Rep. of Germany | 425/239 |
| 2331286 | 6/1977 | France . | |
| 104720 | 3/1917 | United Kingdom . | |
| 1115859 | 5/1968 | United Kingdom . | |
| 1209362 | 10/1970 | United Kingdom . | |
| 1228049 | 4/1971 | United Kingdom . | |

Primary Examiner—Jay H. Woo
Assistant Examiner—Scott Bushey
Attorney, Agent, or Firm—Guy W. Shoup; Patrick T. Bever

[57] ABSTRACT

An apparatus is provided for quantitatively dividing bread dough. The apparatus includes a hopper having vertical side walls. The internal space surrounded by the walls has the same horizontal sectional area at any position along the vertical walls. The apparatus also includes a pair of vertical conveyors extending along the side walls. A dough outlet is formed in the bottom wall of the hopper. A dividing device is located in close proximity to the dough outlet. When the dough is continuously and quantitatively divided by the dividing device into small pieces, the vertical conveyors are driven at a speed of X m/min. in line with the speed of the dough flowing downward on its same level. Each of the dough pieces is then conveyed toward the shaping station. Thus the dough can be quantitatively divided so that a high quality dough is obtained without the gel structure of the gluten being destroyed.

8 Claims, 2 Drawing Sheets

APPARATUS FOR QUANTITATIVELY DIVIDING BREAD DOUGH

This application is a continuation of application Ser. No. 07/571,467, filed Aug. 22, 1990 now abandoned.

BACKGROUND OF THE INVENTION

1. Field of the Invention

This invention relates to a method and an apparatus for quantitatively dividing bread dough or like dough that is kneaded by a mixer.

2. Prior Art

In producing bread a large mass of bread dough, which is obtained by kneading by a mixer, is quantitatively divided by a divider into small pieces. Each of the small pieces is then conveyed toward a shaping station.

In the prior art step of dividing the mass of dough by a divider, the dough is sucked into a cylinder by a piston so that the volume of the dough may be metered before it is cut. As a result, the gel structure of the bread dough, which contains gluten in gel form, is destroyed by the mechanical force imparted to the bread dough by the piston of the divider. The hopper of the divider of the prior art is not constructed to help maintain the uniform fluidity that the bread dough requires when it is throughly and uniformly kneaded.

Factors that obstruct a uniform flow of bread dough will now be discussed by reference to a simplified model of a hopper having vertical side walls as shown in FIGS. 2, 3, and 4.

In FIG. 2, marks A1 and A2 show different levels of the head of the bread dough 1 in a hopper 2. The dough 1 is supplied downward from an outlet that is located at a bottom of the hopper 2, when it is filled up to the level A1. It is faster than when it is filled up to the level A2, since its weight is heavier at the level A1 than at the level A2. Thus the different levels lead to the speed of the bread dough not being uniform, and to being one that changes accordingly as the level moves downward. FIG. 3 shows that the speed of that part of the bread dough flowing downward along the lines S4, in the vicinity of the inner wall surface of the hopper, is low, while the speed of that part of the dough flowing downward along the central line, S1, is high. The difference between the speeds of the dough flow is induced by an internal friction that changes over time. That is, such a changing internal friction leads to the speed of the bread dough flowing downward not being uniform. FIG. 4 shows that a force P, produced as a result of the expansion of the volume of the stocked bread dough due to the progressive fermentation, obstructs the smooth downward flow of the bread dough.

SUMMARY OF THE INVENTION

One object of this invention is to provide a method and apparatus for causing a uniform downward flow of the bread dough.

Another object of this invention is to provide a method and apparatus for quantitatively dividing bread dough by merely cutting it at a position beneath a dough outlet, which is formed in the bottom wall of the hopper, without substantially damaging the gel structure of the bread dough by the metering of the bread dough in the cylinder.

Still another object of this invention is to provide a method and apparatus for eliminating the factors that obstruct a uniform flow of bread dough.

By one aspect of this invention a method is provided for quantitatively dividing bread dough. It comprises the following steps: supplying bread dough into a dough hopper having vertical conveyors along vertical side walls of the hopper, causing the dough to flow downward from a dough outlet located at the bottom of the hopper, controlling the speed of the vertical conveyors according to the condition of the flow of the dough flowing downward from the dough outlet, and dividing the dough that flows from the dough outlet by a dividing device located adjacent the dough outlet, whereby the dough is quantitatively cut and divided.

In a preferred embodiment of the invention the speed of the vertical conveyors is controlled by detecting by a photoelectric sensor the condition of the flow of the dough that flows downward from the dough outlet.

In another preferred embodiment of the invention the divided dough is received and conveyed by a conveyor located beneath the dividing device after the dough is cut and divided by the dividing device.

In accordance with another aspect of this invention, an apparatus is provided for quantitatively dividing bread dough, which comprises: a dough hopper having vertical side walls, a dough outlet formed at the bottom of the hopper, a pair of vertical conveyors located opposite from each other and extending along the side walls of the hopper, a dividing device located adjacent the dough outlet, and means for controlling the speed of the conveyors according to the condition of the flow of the dough flowing downward from the dough outlet.

In a preferred embodiment of this invention this controlling means has a photoelectric sensor. It is located close to and beneath the dough outlet to detect the flow rate of the dough flowing downward from the dough outlet.

In another preferred embodiment of this invention there is also a pair of rollers. They are located opposite each other and adjacent the downstream ends of the vertical conveyors.

In still another preferred embodiment of this invention the rollers are spaced apart from each other at a distance less than the distance between the vertical conveyors.

In further still another preferred embodiment of this invention a detecting device is provided beneath the dough outlet to detect the downstream end of the downwardly flowing dough and to send a dough cutting signal to the dividing device, thereby causing it to cut the dough.

DESCRIPTION OF THE PREFERRED EMBODIMENT

Figure 1:
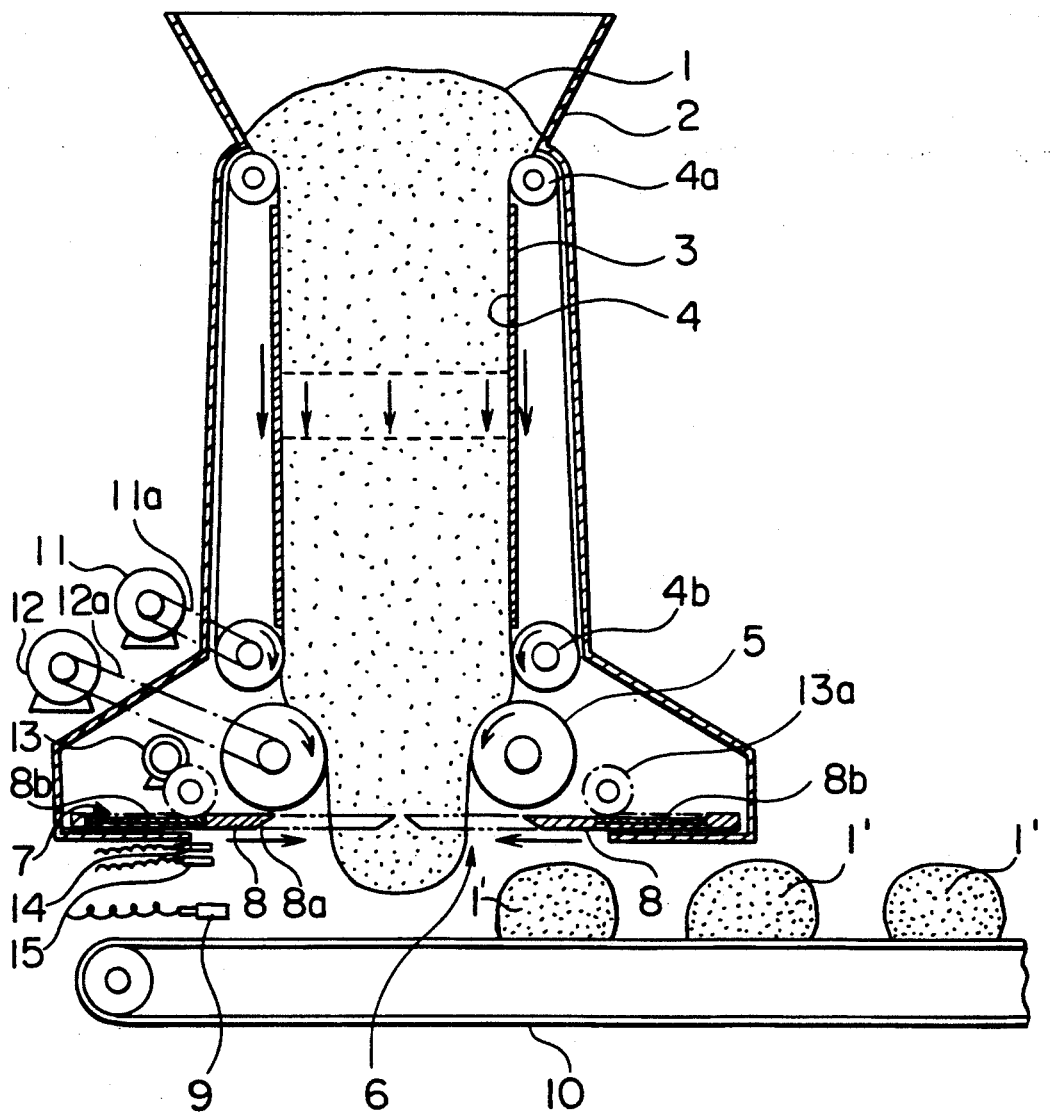
FIG. 1 is a sectional front view of an embodiment of an apparatus of this invention for quantitatively dividing bread dough.
Figure 4:
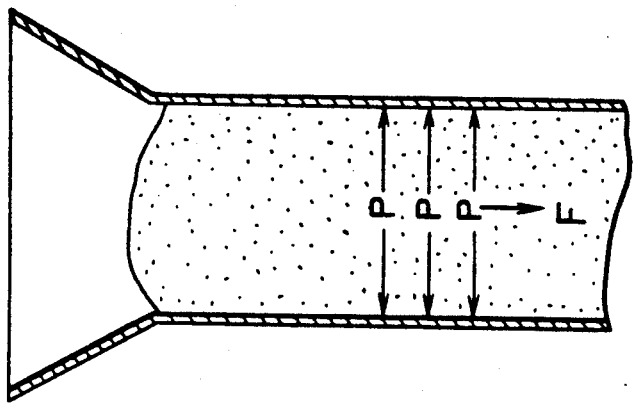
FIGS. 2, 3, and 4 are schematic sectional views to explain the factors obstructing a uniform flow of bread dough in a hopper of the prior art.

FIG. 1 shows an apparatus of the invention for quantitatively dividing bread dough. It includes a hopper 2 having vertical side walls 3 to stock bread dough 1. The internal space surrounded by the inner belts of the conveyors 4 has the same horizontal sectional area at any position along the vertical walls.

A pair of vertical conveyors 4 extend between a pair of rollers 4a and 4b along the two confronting side walls 3 of the hopper 2. The vertical conveyors 4 are also arranged to move along the side walls 3 in the downstream direction. The rollers of the two conveyors 4 are linked to each other by a belt (not shown) to rotate at the same speed. A belt 11a is set between a motor 11 and one of the rollers 4b so that both conveyors 4 are to be moved by the motor 11. A pair of rollers 5 are located opposite each other and close to the downstream ends of the vertical conveyors 4. The rollers 5 are spaced apart from each other at a distance less than the distance between the vertical conveyors 4. The rollers 5 are linked to each other by a belt (not shown) to rotate at the same speed. A belt 12a is set between a motor 12 and one of the rollers 5. The rollers 5 are thus to be rotated by the motor 12 through the belts.

A dough outlet 6 is formed in the bottom wall of the hopper 2, and is located between the lower ends of the rollers 5. A dividing device 7 is located close to the lower ends of the rollers 5, which define the dough outlet 6 between them. The dividing device 7 includes a pair of cutters 8 arranged to slide horizontally along the bottom wall of the hopper 2 toward and away from each other. The cutters 8 have threaded portions 8b that engage gears 13a. The gears 13a are also linked to the shaft of a motor 13. When the motor 13 makes them progress toward each other, edges 8a of these cutters 8 abut each other at the center of the dough outlet 6, thereby cutting the dough 1 flowing downward from this dough outlet 6.

Photoelectric tubes 14 and 15 comprise photoelectric sensors. They are located close to and beneath the dough outlet 6 so that the photoelectric tube 15 is positioned below and spaced apart from the photoelectric tube 14. Their function is to obtain the flow rate of the dough 1 that is flowing downward. The flow rate is obtained by computing the speed of the dough on the basis of the interval between the tubes and the time information that indicates the time at which the downstream end of the dough 1 has passed the positions of the two tubes. The speed of the conveyors 4 can be controlled based on the flow rate of the dough 1 flowing downward so that, if the flow rate is detected to be higher than a control value, the speed of the conveyors 4 is reduced, and vice versa.

A detecting device 9 is provided beneath the dough outlet 6. The detecting device 9 comprises a photoelectric sensor. The device 9 detects the downstream end of the downwardly flowing dough and sends a dough-cutting signal to the dividing device 7. When it receives the dough-cutting signal it cuts the bread dough 1 into small pieces 1'. A receiving conveyor 10 receives them and conveys them toward a shaping station.

Figure 3:
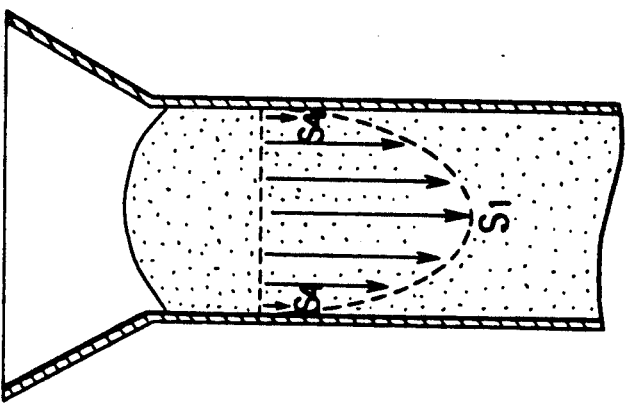
Figure 2:
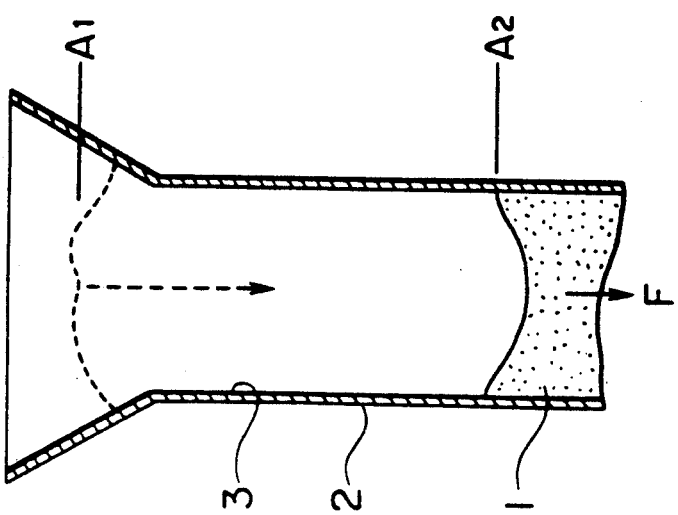

In operation, the dividing device 7 is actuated by the motor 13 to close the opening of the dough outlet 6 and is kept at that position until the dough 1 is filled in the vertical internal space formed by the conveyors 4 and the side walls 3, of the hopper 2. When the dividing device 7 is then operated by the motor 13 to slide the cutters 8 outwardly so that the dough outlet 6 is opened, the dough 1 flows downwardly from there. At the same time, the vertical conveyors 4 start to be driven by the motor 11 at a speed of X m/min. Because of the vertical conveyors 4, the dough 1 is urged to flow downward at the speed of the conveyors 4. The speed of all parts of the dough 1 is uniform. That is, the speed of that part of the bread dough flowing downward along the line of flow S4 of FIG. 3, shown in the vicinity of the inner wall surface of the hopper 2, is the same as the speed of the part of the dough in the center of the hopper 2. The rollers 5 are provided so as to maintain the uniform speed of the dough 1. Even if the smooth flow of the dough is disturbed by various kinds of factors that cannot be eliminated by the conveyors 4, the rollers 5 can compensate for the disturbance of the smooth flow of the dough. Thus the control of the speed of the conveyors 4 can be facilitated. The rollers 5 are preferably rotated at a speed higher than the moving speed of the vertical conveyors 4, since the spacing between the rollers 5 is smaller than the spacing between the vertical conveyors 4. The dividing device 7 operates in response to the cutting-signal from the detecting device 9, which sends the signal when it detects the downstream end of the downward flowing dough, so that the dough 1 can be continuously and quantitatively divided. By suitably controlling the moving speed of the vertical conveyors 4, the dough flowing speed and, hence, the rate of the bread production, can be changed as desired.

Each of the dough pieces 1' is then conveyed toward the shaping station.

The dividing device 7 can also be operated by, for example, a dough-cutting timing signal from a computer. The computer calculates the dough-flowing speed on the basis of the signals of the tubes 14 and 15, and decides on the dough-cutting timing.

The dough-cutting speed of the dividing device 7 can also be changed, since the dough-flowing speed can supplementarily be controlled by the rollers 5.

An experiment was conducted in which the bread dough 1 had a water content of 50%, the speed of the vertical conveyors 4 was X m/min, and the sectional area of the hopper 2 was 0.15 m². The results of the experiment proved that, when the speed X was changed in the range of 1 to 5 m/min, the speed of the dough flowing downward per minute was stabilized at each speed, although each of the amounts of the dough flow was proportional, more or less, to the speed of the vertical conveyors 4.

In conclusion, it will be understood from the foregoing description that the present invention provides a method and apparatus which can eliminate the prior art disadvantages and that can quantitatively divide dough so that a high quality dough is provided without the gel structure of the gluten being destroyed.

I claim:

1. An apparatus for quantitatively dividing bread dough comprising:
   a. a dough hopper having a pair of vertical side walls,
   b. a dough outlet formed adjacent a downstream end of said dough hopper,
   c. a pair of substantially parallel vertical conveyors located opposite from each other and extending along the pair of side walls of the hopper,
   d. a dividing device located adjacent the dough outlet, and
   e. means for controlling a conveying speed of the vertical conveyors to make uniform the speed of substantially all parts of the dough between the conveyors based on a flow rate of the dough flowing downward from the dough outlet.

2. The apparatus for quantitatively dividing bread dough of claim 1, wherein the controlling means further comprises:
   means for detecting the dough flowing downward from the dough outlet comprising a pair of sensors located beneath and close to the dough outlet, said sensors generating a sensor signal indicative of the flow rate;

means for generating a flow rate signal in response to said sensor signal; and means for receiving the flow rate signal and for controlling the conveying speed in response to the flow rate signal.

3. The apparatus for quantitatively dividing bread dough of claim 1, wherein a pair of rollers are located opposite from each other and adjacent downstream ends of the vertical conveyors, the speed of the rollers being related to the speed of the vertical conveyors.

4. The apparatus for quantitatively dividing bread dough of claim 3, wherein the rollers are spaced apart from each other at a distance smaller than the distance between the vertical conveyors.

5. The apparatus for quantitatively dividing bread dough of claims 1, 2, or 4, wherein a detecting device is provided beneath the dough outlet to detect a downstream end of the downwardly flowing dough and to send a dough-cutting signal to the dividing device, thereby causing the dividing device to cut the dough.

6. The apparatus for quantitatively dividing bread dough of claim 2, wherein a pair of rollers are located opposite from each other and adjacent downstream ends of the vertical conveyors, the speed of the rollers being related to the speed of the vertical conveyors.

7. The apparatus for quantitatively dividing bread dough of claim 6, wherein the rollers are spaced apart from each other at a distance smaller than the distance between the vertical conveyors.

8. The apparatus for quantitatively dividing bread dough of claim 6, wherein a detecting device is provided beneath the dough outlet to detect a downstream end of the downwardly flowing dough and to send a dough-cutting signal to the dividing device, thereby causing the dividing device to cut the dough.

* * * * *